US008092557B2

(12) United States Patent
Muthu et al.

(10) Patent No.: US 8,092,557 B2
(45) Date of Patent: Jan. 10, 2012

(54) WATER SOLUBLE POLYMER BINDER FOR LITHIUM ION BATTERY

(75) Inventors: Milburn Ebenezer Jacob Muthu, Breinigsville, PA (US); Monira Mamari, Allentown, PA (US); Chester Crane, Bangor, PA (US)

(73) Assignee: International Battery, Inc., Allentown, PA (US)

( * ) Notice: Subject to any disclaimer, the term of this patent is extended or adjusted under 35 U.S.C. 154(b) by 0 days.

(21) Appl. No.: 13/073,082

(22) Filed: Mar. 28, 2011

(65) Prior Publication Data

US 2011/0168956 A1 Jul. 14, 2011

Related U.S. Application Data

(62) Division of application No. 12/941,100, filed on Nov. 8, 2010, now Pat. No. 7,931,985.

(51) Int. Cl.
*H01M 6/00* (2006.01)
*H01M 4/60* (2006.01)

(52) U.S. Cl. ....... 29/623.1; 429/212; 429/217; 429/232; 252/182.1

(58) Field of Classification Search .................. 429/217, 429/212, 209, 232; 29/623.1; 252/182.1, 252/511, 519.1, 519.33
See application file for complete search history.

(56) References Cited

U.S. PATENT DOCUMENTS

| | | | |
|---|---|---|---|
| 3,625,759 A | 12/1971 | Williams | |
| 5,150,283 A | 9/1992 | Yoshida et al. | |
| 5,175,222 A | 12/1992 | Betso | |
| 5,514,488 A | 5/1996 | Hake et al. | |
| 5,707,756 A | 1/1998 | Inoue et al. | |
| 5,795,558 A | 8/1998 | Aoki et al. | |
| 5,866,279 A | 2/1999 | Wada et al. | |
| 5,897,955 A | 4/1999 | Drumheller | |
| 6,007,947 A | 12/1999 | Mayer | |
| 6,031,712 A | 2/2000 | Kurihara et al. | |
| 6,159,636 A | 12/2000 | Wang et al. | |
| 6,183,908 B1 | 2/2001 | Miyasaka et al. | |
| 6,235,427 B1 | 5/2001 | Idota et al. | |
| 6,282,081 B1 | 8/2001 | Takabayashi et al. | |
| 6,372,387 B1 * | 4/2002 | Kawakami et al. | 429/303 |
| 6,399,246 B1 | 6/2002 | Vandayburg et al. | |
| 6,497,979 B1 | 12/2002 | Iijima et al. | |
| 6,602,742 B2 | 8/2003 | Maletin et al. | |
| 6,616,903 B2 | 9/2003 | Poles et al. | |
| 6,627,252 B1 | 9/2003 | Nanjundiah et al. | |
| 6,697,249 B2 | 2/2004 | Maletin et al. | |
| 6,770,397 B1 | 8/2004 | Maeda et al. | |
| 6,811,911 B1 | 11/2004 | Peled et al. | |
| 6,852,449 B2 | 2/2005 | Nagata et al. | |
| 6,881,517 B1 | 4/2005 | Kanzaki et al. | |
| 6,946,007 B2 | 9/2005 | Bendale et al. | |
| 6,955,694 B2 | 10/2005 | Bendale et al. | |
| 7,052,629 B2 | 5/2006 | Maeda et al. | |
| 7,052,803 B2 | 5/2006 | Kato et al. | |
| 7,083,829 B2 | 8/2006 | Hoke et al. | |
| 7,227,737 B2 | 6/2007 | Mitchell et al. | |
| 7,267,907 B2 | 9/2007 | Kim | |
| 7,316,864 B2 | 1/2008 | Nakayama et al. | |
| 7,393,476 B2 | 7/2008 | Shiozaki et al. | |
| 7,419,745 B2 | 9/2008 | Chaturvedi et al. | |
| 7,422,826 B2 | 9/2008 | Xing et al. | |
| 7,425,386 B2 | 9/2008 | Takezawa et al. | |
| 7,481,991 B2 | 1/2009 | Kawasato et al. | |
| 7,508,651 B2 | 3/2009 | Mitchell et al. | |
| 7,531,272 B2 | 5/2009 | Park et al. | |
| 7,547,491 B2 | 6/2009 | Ham et al. | |
| 7,558,050 B2 | 7/2009 | Roh et al. | |
| 7,749,658 B2 | 7/2010 | Isono et al. | |
| 2002/0110732 A1 | 8/2002 | Coustier et al. | |
| 2003/0091883 A1 | 5/2003 | Peled et al. | |
| 2003/0118904 A1 | 6/2003 | Hosokawa et al. | |
| 2003/0138696 A1 | 7/2003 | Peres et al. | |
| 2003/0172509 A1 | 9/2003 | Maletin et al. | |
| 2004/0020763 A1 | 2/2004 | Kanzaki et al. | |
| 2004/0023115 A1 | 2/2004 | Kato et al. | |
| 2004/0121232 A1 | 6/2004 | Kato et al. | |
| 2004/0234850 A1 * | 11/2004 | Watarai et al. | 429/217 |
| 2005/0069763 A1 | 3/2005 | Hong et al. | |
| 2005/0069769 A1 | 3/2005 | Nakayama et al. | |
| 2005/0074669 A1 | 4/2005 | Park et al. | |
| 2005/0142446 A1 | 6/2005 | Yamamoto et al. | |
| 2005/0238958 A1 | 10/2005 | Kim | |
| 2006/0058462 A1 | 3/2006 | Kim et al. | |
| 2006/0166093 A1 | 7/2006 | Zaghib et al. | |
| 2006/0194116 A1 | 8/2006 | Suzuki et al. | |
| 2006/0228627 A1 | 10/2006 | Nakayama et al. | |
| 2006/0275661 A1 | 12/2006 | Kim et al. | |
| 2007/0055023 A1 | 3/2007 | Han et al. | |
| 2007/0264568 A1 | 11/2007 | Ryu et al. | |
| 2007/0264573 A1 | 11/2007 | Yamada et al. | |
| 2007/0292765 A1 | 12/2007 | Inoue et al. | |
| 2008/0089006 A1 | 4/2008 | Zhong et al. | |
| 2008/0090138 A1 | 4/2008 | Vu et al. | |
| 2008/0118834 A1 | 5/2008 | Yew et al. | |
| 2008/0118840 A1 | 5/2008 | Yew et al. | |
| 2008/0160415 A1 | 7/2008 | Wakita et al. | |
| 2008/0212260 A1 | 9/2008 | Roh et al. | |
| 2008/0254362 A1 | 10/2008 | Raffaelle et al. | |

(Continued)

FOREIGN PATENT DOCUMENTS

| | | |
|---|---|---|
| EP | 573266 A1 | 12/1993 |
| EP | 1172878 A2 | 1/2002 |
| JP | 62270337 A | 11/1987 |
| JP | 8069791 | 3/1996 |
| JP | 10208729 A | 8/1998 |
| JP | 11149929 A | 6/1999 |
| JP | 2002226505 A | 8/2002 |
| JP | 2004185826 A | 7/2004 |
| WO | 2007142579 A1 | 12/2007 |

OTHER PUBLICATIONS

Title: "Effect of pH on the Synthesis of LiCoO2 with Malonic Acid and Its Charge/Discharge Behavior for a Lithium Secondary Battery" Source: Bulletin of the Korean Chemical Society 2000, vol. 21, No. 11 pp. 1125-1132.

*Primary Examiner* — Raymond Alejandro

(74) *Attorney, Agent, or Firm* — Design IP

(57) ABSTRACT

An electrode for a rechargeable lithium ion battery includes an electro-active material, a (polystyrenebutadiene rubber)-poly (acrylonitrile-co-acrylamide) polymer, and a conductive additive. A battery using the inventive electrode is also disclosed.

14 Claims, 2 Drawing Sheets

U.S. PATENT DOCUMENTS

| | | |
|---|---|---|
| 2008/0299461 A1 | 12/2008 | Kim |
| 2009/0080141 A1 | 3/2009 | Eilertsen |
| 2009/0148772 A1 | 6/2009 | Kawasato et al. |
| 2009/0155694 A1 | 6/2009 | Park |
| 2009/0214952 A1* | 8/2009 | Wakita et al. ............. 429/213 |
| 2009/0220678 A1 | 9/2009 | Kono et al. |
| 2009/0258296 A1 | 10/2009 | Kawasato et al. |
| 2009/0268377 A1 | 10/2009 | Choi et al. |
| 2009/0317718 A1 | 12/2009 | Imachi et al. |
| 2010/0009258 A1 | 1/2010 | Hasegawa et al. |
| 2010/0047690 A1 | 2/2010 | Tsuchiya et al. |
| 2010/0075229 A1 | 3/2010 | Atsuki et al. |
| 2010/0112441 A1 | 5/2010 | Fukumine et al. |
| 2010/0117031 A1 | 5/2010 | Akagi et al. |
| 2010/0136430 A1 | 6/2010 | Lee |
| 2010/0140554 A1 | 6/2010 | Oki et al. |
| 2010/0143799 A1 | 6/2010 | Park |
| 2011/0045168 A1 | 2/2011 | Seo et al. |

* cited by examiner

WATER SOLUBLE POLYMER BINDER FOR LITHIUM ION BATTERY

CROSS REFERENCE TO RELATED APPLICATIONS

This application is a divisional of U.S. patent application Ser. No. 12/941,100, filed Nov. 8, 2010, now U.S. Pat. No. 7,931,985.

FIELD OF INVENTION

The present invention relates to a water soluble polymer binder for use in a rechargeable lithium ion battery and the battery in which the binder is used.

BACKGROUND

Rechargeable batteries use polymer binders to bind the active particulate material together and adhere this particulate material to the current collector in the fabrication of battery electrodes. The binder is generally comprised of one or more polymers. The binders commonly used in commercial li-ion batteries are polyvinyledene fluoride (PVDF), ethylene-propylene and a diene (EPDM). These polymers are generally insoluble in water and, thus are dissolved in an organic solvent such as N-methyl pyrrolidone (NMP). The organic solvent additionally serves as a dispersion medium for the active materials. Some disadvantages of using organic solvents are that they have relatively high cost, can possess negative environmental impacts, and pose disposal issues. Further, PVDF is highly unstable and tends to break down at high temperatures.

Known water soluble binders, such as carboxy methyl cellulose (CMC), require a thickening agent to control the viscosity of the binder. Further, they exhibit only marginal adhesion capability. Polytetrafluoroethylene (PTFE) based water soluble binders also exhibit poor adhesion and do not exhibit good cycle life. Further, other known binders undergo hydrolysis under acid or basic conditions. To avoid the hydrolysis and to improve the dispersion, adhesion to the current collector, in a water-based blending process, the pH must therefore be tightly controlled.

Accordingly, there is a need for a water soluble polymer binder in rechargeable lithium batteries. This water soluble binder should exhibit stability throughout a wide pH range, which results in greater ease in preparing slurry for electrode fabrication.

SUMMARY

Briefly, the present invention provides an electrode comprising an electro-active material, a (polystyrenebutadiene rubber)-poly (acrylonitrile-co-acrylamide) polymer; and a conductive additive.

The present invention also provides a battery comprising a positive electrode mix comprising a positive electrode active material and a water soluble binder comprising a (polystyrenebutadiene rubber)-poly (acrylonitrile-co-acrylamide) polymer. A negative electrode mix comprises a negative electrode active material and a water soluble binder comprising a (polystyrenebutadiene rubber)-poly (acrylonitrile-co-acrylamide) polymer. The battery further comprises an electrolyte.

Further, the present invention provides a battery comprising a positive electrode comprising a positive active material selected from the group consisting of $LiNiCoAlO_2$, $LiMn_2O_4$, $LiNi_yCo_xM_zO$, where M=Mn, Al, Sn, In, Ga or Ti and $0.15<x<0.5$, $0.5<y<0.8$ and $0<z<0.15$, $Li[Li_{(1-2y)/3}Ni_yMn_{(2-y)/3}]O_2$, $Li[Li_{(1-y)/3}Co_yMn_{(2-2y)/3}]O_2$ and $Li[Ni_yCo_{1-2y}Mn_y]O_2$ where $x=(2-y)/3$ and $0<y<0.5$, $LiNiCo_2.MnO_2$, lithium rich compounds $Li_{1+y}(Ni_{1/3}Co_{1/3}Mn_{1/3})_{1-y}O_2$, where $y=(x/(2+x)$ and $x=0-0.33$, and $xLi_2MnO_3(1-x)Li(NiCoMn)O_2$ and $Li_{(1+y)}(Ni_{0.5}Co_{0.2}Mn_{0.3})_{1-y}O_2$, where $y=(x/(2+x)$ and $x=0-0.33$, and $LiMPO_4$, where M is one or more of the first row transition-metal cations selected from the group consisting of V, Cr, Mn, Fe, Co, Ni, and combinations thereof, a water soluble binder comprising a (polystyrenebutadiene rubber)-poly (acrylonitrile-co-acrylamide) polymer, and a conductive additive selected from the group consisting of carbon black, acetylene black, graphite, and combinations thereof. A negative electrode comprises a negative active material selected from the group consisting of graphite, hard carbon, silicon, silicon alloy, tin, tin alloy, and lithium titanate. The negative electrode further comprises a water soluble binder comprising the (polystyrenebutadiene rubber)-poly (acrylonitrile-co-acrylamide) polymer and the conductive additive. The battery also includes an electrolyte comprised of lithium salt in cyclic and linear carbonates or other solvents used in the Li-ion battery electrolyte

BRIEF DESCRIPTION OF THE DRAWINGS

The foregoing summary, as well as the following detailed description of the invention, will be better understood when read in conjunction with the appended drawings. For the purpose of illustrating the invention, there is shown in the drawing certain embodiments of the present invention. It should be understood, however, that the invention is not limited to the precise arrangements shown. In the drawings.

DETAILED DESCRIPTION OF THE PREFERRED EMBODIMENTS

Figure 1:
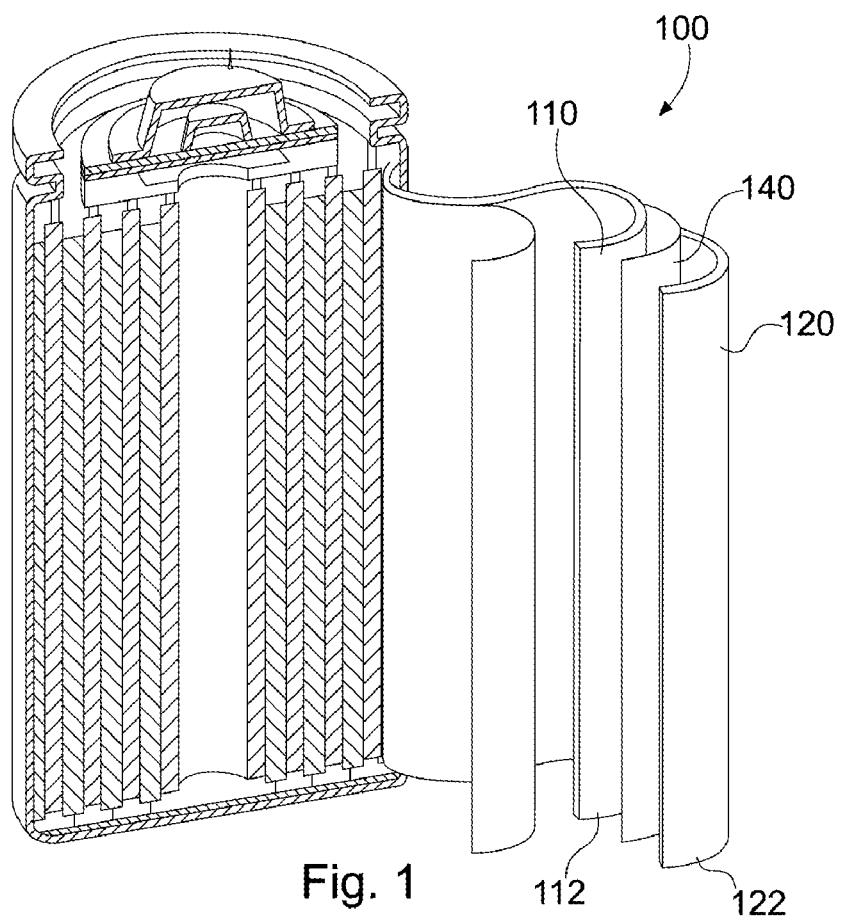
FIG. 1 is a schematic view of a battery formed in a jellyroll configuration according to an exemplary embodiment of the present invention.

In describing the embodiments of the invention illustrated in the drawings, specific terminology will be used for the sake of clarity. However, the invention is not intended to be limited to the specific terms so selected, it being understood that each specific term includes all technical equivalents operating in similar manner to accomplish similar purpose. It is understood that the drawings are not drawn exactly to scale.

The following describes particular embodiments of the present invention. It should be understood, however, that the invention is not limited to the embodiments detailed herein. Generally, the following disclosure refers to lithium ion batteries and a water soluble binder for use in lithium ion batteries.

Figure 1A:
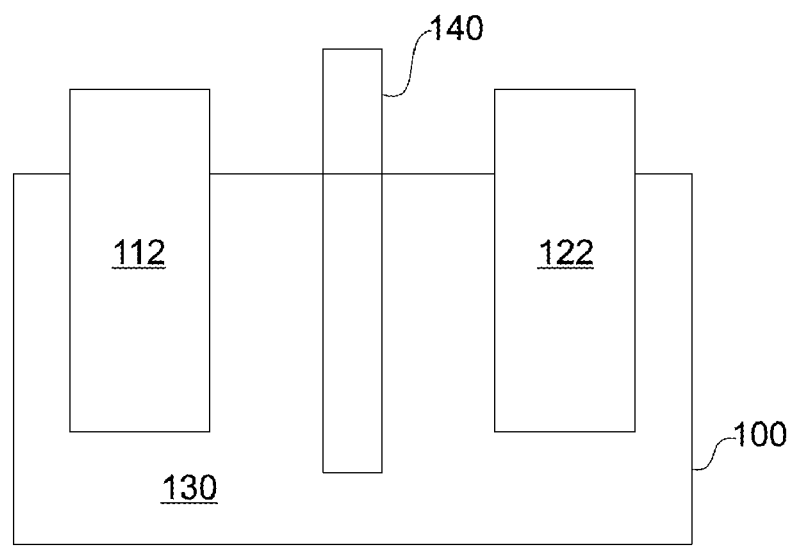
FIG. 1A is a schematic view of the battery of FIG. 1 with the electrolyte.
Figure 2:
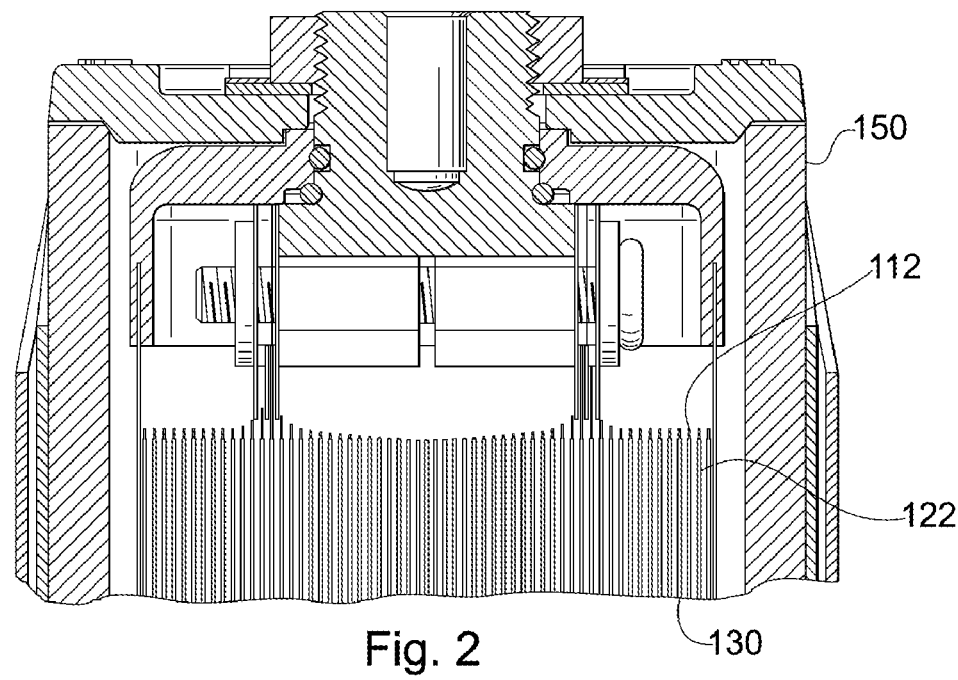
FIG. 2 is a cross-sectional representation of a prismatic electrochemical cell according to an exemplary embodiment of the present invention.

Referring to FIGS. 1 and 1A, a rechargeable lithium ion battery 100 according to an exemplary embodiment of the present invention includes a positive electrode 112 formed from a positive electrode mix 110, a negative electrode 122 formed from a negative electrode mix 120, and an electrolyte 130. While FIG. 1 illustrates battery 100 formed in a "jelly-roll" configuration, those skilled in the art will recognize that other formations, such as, for example, a prismatic configuration, which is illustrated in FIG. 2, may also be used within the teaching of the present invention.

Positive electrode mix 110 includes a positive electrode active material selected from the group consisting of $LiNiCoAlO_2$, $LiMn_2O_4$, $LiNi_yCo_xM_zO$, where M=Mn, Al, Sn, In, Ga or Ti and $0.15<x<0.5$, $0.5<y<0.8$ and $0<z<0.15$, $Li[Li_{(1-2y)/3}Ni_yMn_{(2-y)/3}]O_2$, $Li[Li_{(1-y)/3}Co_yMn_{(2-2y)/3}]O_2$ and $Li[Ni_yCo_{1-2y}Mn_y]O_2$ where $x=(2-y)/3$ and $0<y<0.5$, $LiNiCoO_2 \cdot MnO_2$, lithium rich compounds $Li_{1+y}(Ni_{1/3}Co_{1/3}Mn_{1/3})_{1-y}O_2$, where $y=(x/(2+x)$ and $x=0-0.33$, and $xLi_2MnO_3(1-x)Li(NiCoMn)O_2$ and $Li_{(1+y)}(Ni_{0.5}Co_{0.2}Mn_{0.3})_{1-y}O_2$, where $y=(x/(2+x)$ and $x=0-0.33$, and $LiMPO_4$, where M is one or more of the first row transition-metal cations selected from the group consisting of V, Cr, Mn, Fe, Co, Ni, and combinations thereof. In an exemplary embodiment, the positive electrode active material is between about 80 and about 90 percent (by weight) of the positive electrode mix 110.

Positive electrode mix 110 may further include a conductive additive or additives selected from the group consisting of carbon black, acetylene black, graphite and combinations thereof. In an exemplary embodiment, the conductive additive material is between about 0 and about 20 percent (by weight) of the positive electrode mix 110.

Positive electrode mix 110 also includes a water soluble polymer comprising a copolymer of (polystyrenebutadiene rubber)-poly (acrylonitrile-co-acrylamide), and water. The binder is mixed with the positive electrode active material, the conductive additive, and water to form a slurry.

Polystyrenebutadiene rubber is less susceptible than other water soluble binders to hydrolysis under acidic or basic conditions (i.e., pH less than 5 or greater than 10). It has been found that the combination of poly (acrylonitrile-co-acrylamide) into the polystyrenebutadiene rubber, forming a four-monomer-based copolymer, results in a water soluble binder with even more stability than polystyrenebutadiene rubber over a broader pH range. This attribute makes slurry preparation easier than when using prior art water soluble binders because the pH of the slurry does not have to be as tightly controlled throughout the blending process as it had in prior art slurries.

An exemplary (polystyrenebutadiene rubber)-poly (acrylonitrile-co-acrylamide) polymer has the chemical formula:

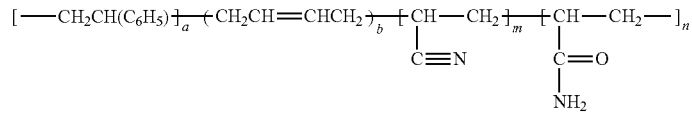

where a, b, m, and n are each greater than zero and are percentages that add up to 100 percent (or "1"). In an exemplary embodiment, $a=b=m=n=0.25$. In another exemplary embodiment, $a>b$ and $m>n$. In an exemplary embodiment, $a=0.3$, $b=0.2$, $m=0.333$, and $n=0.167$.

In an exemplary embodiment, the mole ratio of styrene units to butadiene units (a:b) is between about 0.5:1.5 and about 1.5:0.5 and the mole ratio of acrylonitrile units to acrylamide units (m:n) is between about 0.5:1.5 and about 1.5:0.5. Further, an exemplary mole ratio of polystyrenebutadiene units to (acrylonitrile-co-acrylamide) units (a+b):(c+d) is between about 0.25:0.75 and about 0.75:0.25.

In an exemplary embodiment, an average molecular weight of the polymer is between about 10,000 and 1,000,000 and in another exemplary embodiment, the average molecular weight of the polymer is between about 100,000 and 200,000.

In an exemplary embodiment, the water soluble binder is between about 1 and about 10 percent (by weight) of positive electrode mix 110.

The water soluble binder is used to make the slurry in the absence of a thickening agent or any external reagent to control its viscosity. An exemplary binder has a viscosity ranging between about 3,000 centipoise and about 50,000 centipoise. The water soluble binder is also provided in the absence of a wetting agent or any other additives to improve the active material and conductive additive dispersion.

The slurry is coated on an aluminum current collector or a carbon coated aluminum current collector to form positive electrode 112. The slurry pH can range between about 7 and about 11.7 without significant reaction with the current collector.

Negative electrode mix 120 comprises a negative electrode active additive or additives material selected from the group consisting of graphite, hard carbon, silicon, silicon alloy, tin, tin alloy, and lithium titanate. In an exemplary embodiment, the negative electrode active material is between about 80 and about 95 percent (by weight) of the negative electrode mix 120.

Negative electrode mix 120 may further include a conductive additive selected from the group consisting of carbon black, acetylene black, graphite and combinations thereof. In an exemplary embodiment, the conductive additive material is between about 0 and about 20 percent (by weight) of the negative electrode mix 120.

Negative electrode mix 120 further comprises the water soluble binder as described above with respect to the positive electrode mix 110. In an exemplary embodiment, the water soluble binder is between about 1 and about 10 percent (by weight) of the negative electrode mix 120. The binder is mixed with the negative electrode active material, the conductive additive, and water to form a slurry. The slurry is coated on a copper current collector to form negative electrode 122.

Figure 3:
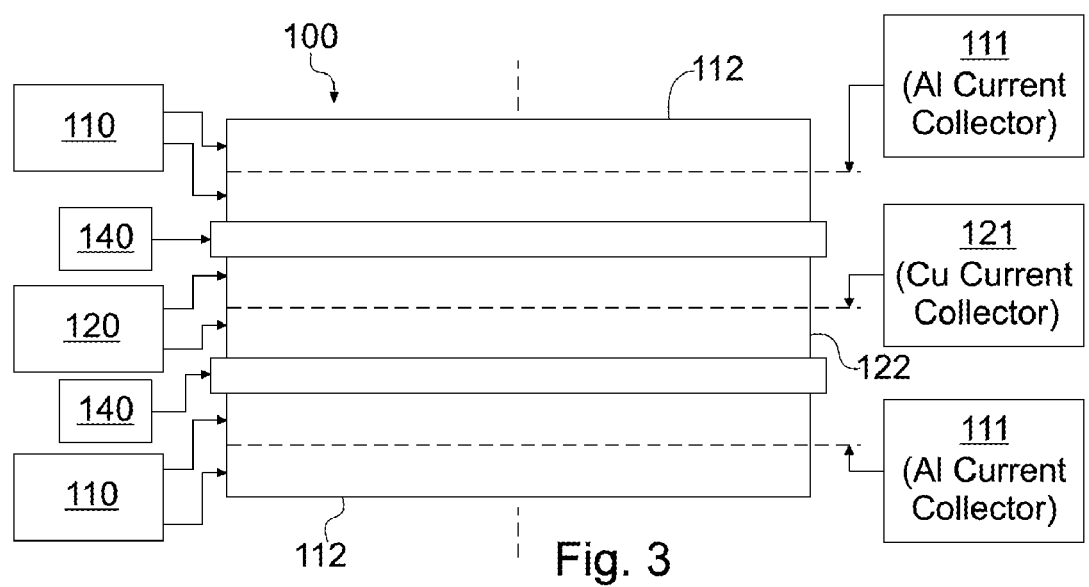
FIG. 3 is a schematic representation of a positive electrode, a separator and a negative electrode-bi-cell configuration of the exemplary embodiment illustrated in FIG. 1.

An exemplary electrolyte 130 may be comprised of lithium salts such as $LiBF_4$, $LiPF_6$, LiBOB, LiTFSI or LiFSI or mixtures thereof in cyclic and linear carbonates or other solvent combinations To form battery 100, after positive electrode 112 and negative electrode 122 are formed, positive electrode 112 and negative electrode 122 are each then compressed or calendared for specific thickness. Electrodes 112, 122 are stacked as shown in FIG. 3, with separator 140 between each positive electrode 112 and negative electrode 122. The stack is dried in a vacuum oven until the moisture is below 2000 ppm, and most preferably below 200 ppm. The electrode may also be dried separately and stacked inside the dry room. The electrode stack may be inserted into a polyethylene or polypropylene cell housing 150, shown in FIG. 2, and filled with electrolyte 130, forming battery 100. Battery 100 is then charged and discharged to complete the forming process.

EXAMPLES

The following examples are given purely as an illustration and should not be interpreted as constituting any kind of limitation to the invention.

The preparation of the binder was by water-phase precipitation polymerization. $K_2S_2O_8$—$Na_2S_2O_5$ was used as the initiator system in the presence of $Fe^{2+}$. A round-bottom flask was charged with a solution of 0.225 g (0.8 mmol) potassium persulfate, 0.105 g (0.6 mmol) sodium metabisulfite, and 1 ppm ferrous sulfate in 150 mL of deionized water. A solution of 18.44 g (0.177 mol) styrene, 9.58 g (0.177 mol) butadiene, 9.40 g (0.177 mol) acrylonitrile, and 12.59 g (0.177 mol) acrylamide in 150 mL of deionized water was added to the reaction mixture while being mixed with an overhead stirrer. The reaction was conducted under a nitrogen atmosphere for 2 hours in a water bath controlled at 50° C. The polymer was then filtered and washed with deionized water to remove the unreacted monomers and initiator. The yield was about 53 percent.

The positive active material mix is prepared by mixing between about 10 and about 90 weight percent of active material, between about 0 and about 20 weight percent of conductive additive and between about 1 and about 10 weight percent of the binder polymer disclosed above, and water ranging between 20 to 80 weight percent. High pH is a major problem in the positive active materials, which contains mostly cobalt and nickel or combinations thereof with other transition metals. To control the pH of the positive active material slurry, diluted polymeric acid is added to the slurry very slowly until the pH of the slurry was between about 7 and about 11.7, and most preferably between about 7 and about 10. The reduced pH of the slurry helps to improve the dispersion and the reaction with the current collector is suppressed. Some examples of this carboxylic acid are: Polylactic acid (PLA), Polyacrylic acid, Polysuccinic acid, poly maleic acid and anhydride, poly furoic (pyromucic acid), poly fumaric acid, poly sorbic acid, poly linoleic acid, poly linolenic acid, poly glutamic acid, poly methacrylic acid, poly licanic acid, poly glycolic acid, poly aspartic acid, Poly amic acid, poly formic acid, poly acetic acid, poly propoionic acid, poly butyric acid, poly sebacic acid, and copolymers thereof. The list of polymer acid examples may be equally applied to any other exemplary embodiment(s) of this specification as suitable, and is not exclusive.

The negative active mix is prepared by mixing between about 10 and about 95 weight percent active material, between about 0 and about 20 weight percent of conductive additive and between about 1 and about 10 weight percent of the binder polymer disclosed above. The negative electrode slurry pH is between about 7 and about 10. pH control for the negative active mix is not necessary. The electrolyte in the exemplary embodiment was lithium salt in cyclic and linear carbonates.

The cells were built as described in FIGS. 1-3. The cells were then filled with electrolyte 130.

While the principles of the invention have been described above in connection with preferred embodiments, it is to be clearly understood that this description is made only by way of example and not as a limitation of the scope of the invention.

What is claimed is:

1. A method of making a positive electrode, the method comprising:
   combining a positive active material, a water soluble binder comprising a (polystyrenebutadiene rubber)-poly (acrylonitrile-co-acrylamide) polymer, and a conductive additive to form a positive electrode mix in the absence of a thickening or wetting agent, the positive electrode mix having a pH between 7.0 and 11.7, the conductive additive from the group consisting of carbon black, acetylene black, graphite, and combinations thereof; and
   applying the positive electrode mix to a current collector to form the positive electrode.

2. A method of making a positive electrode, the method comprising:
   combining a positive active material, a water soluble binder comprising a (polystyrenebutadiene rubber)-poly (acrylonitrile-co-acrylamide) polymer, and a conductive additive to form a positive electrode mix in the absence of a thickening agent and a wetting agent.

3. The method of claim 2, further comprising combining a positive active material, a water soluble binder comprising a (polystyrenebutadiene rubber)-poly (acrylonitrile-co-acrylamide) polymer, and a conductive additive to form a positive electrode mix, the positive active material from the group consisting of $LiNiCoAlO_2$, $LiMn_2O_4$, $LiNi_yCo_xM_zO$, where M=Mn, Al, Sn, In, Ga or Ti and $0.15<x<0.5$, $0.5<y<0.8$ and $0<z<0.15$, $Li[Li_{(1-2y)/3}Ni_yMn_{(2-y)/3}]O_2$, $Li[Li_{(1-y)/3}Co_yMn_{(2-2y)/3}]O_2$ and $Li[Ni_yCo_{1-2y}Mn_y]O_2$ where $x=(2-y)/3$ and $0<y<0.5$, $LiNiCoO_2.MnO_2$, lithium rich compounds $Li_{1+y}(Ni_{0.5}Co_{0.2}Mn_{0.3})_{1-y}O_2$, where $y=(x/(2+x))$ and $x=0-0.33$, and $xLi_2MnO_3(1-x)Li(NiCoMn)O_2$ and $Li_{(1+y)}(Ni_{0.5}Co_{0.2}Mn_{0.3})_{1-y}O_2$, where $y=(x/(2+x))$ and $x=0-0.33$, and $LiMPO_4$, where M is one or more of the first row transition-metal cations selected from the group consisting of V, Cr, Mn, Fe, Co, Ni, and combinations thereof.

4. The method of claim 2, further comprising combining a positive active material, a water soluble binder, and a conductive additive, selected from the group consisting of carbon black, acetylene black, graphite, and combinations thereof, to form a positive electrode mix.

5. The method of claim 2, further comprising applying the positive electrode mix to a current collector to form the positive electrode.

6. The method of claim 2, further comprising combining a positive active material, a water soluble binder comprising a (polystyrenebutadiene rubber)-poly (acrylonitrile-co-acrylamide) polymer, and a conductive additive to form a positive electrode mix having a pH between 7.0 and 11.7.

7. The method of claim 2, further comprising combining a positive active material, a water soluble binder comprising a (polystyrenebutadiene rubber)-poly (acrylonitrile-co-acrylamide) polymer, and a conductive additive to form a positive electrode mix, the (polystyrenebutadiene rubber)-poly (acrylonitrile-co-acrylamide) polymer comprising acrylonitrile units and acrylamide units and having a molar ratio acrylonitrile units to acrylamide units of between about 3:1 and about 1:1.

8. The method of claim 2, further comprising combining a positive active material, a water soluble binder comprising a (polystyrenebutadiene rubber)-poly (acrylonitrile-co-acrylamide) polymer, and a conductive additive to form a positive electrode mix, the (polystyrenebutadiene rubber)-poly (acrylonitrile-co-acrylamide) polymer comprising polystyrenebutadiene units and acrylonitrile-co-acrylamide units and having a molar ratio polystyrenebutadiene units to acrylonitrile-co-acrylamide units of between about 0.25:0.75 and about 0.75:0.25.

9. The method of claim 2, further comprising combining a positive active material, a water soluble binder comprising a (polystyrenebutadiene rubber)-poly (acrylonitrile-co-acrylamide) polymer, and a conductive additive to form a positive electrode mix, the (polystyrenebutadiene rubber)-poly (acrylonitrile-co-acrylamide) polymer comprising styrene units and butadiene units and having a molar ratio styrene units to butadiene units of between about 0.5:1.5 and about 1.5:0.5.

10. The method of claim 2, further comprising combining a positive active material, a water soluble binder comprising a (polystyrenebutadiene rubber)-poly (acrylonitrile-co-acrylamide) polymer, and a conductive additive to form a positive electrode mix, the (polystyrenebutadiene rubber)-poly (acrylonitrile-co-acrylamide) polymer having an average molecular weight of between about 10,000 and 1,000,000.

11. The method of claim 2, further comprising combining a positive active material, a water soluble binder comprising a (polystyrenebutadiene rubber)-poly (acrylonitrile-co-acrylamide) polymer, and a conductive additive to form a positive electrode mix, the (polystyrenebutadiene rubber)-poly (acrylonitrile-co-acrylamide) polymer having an average molecular weight of between about 100,000 and 200,000.

12. The method of claim 2, further comprising combining a positive active material, a water soluble binder comprising a (polystyrenebutadiene rubber)-poly (acrylonitrile-co-acrylamide) polymer, and a conductive additive to form a positive electrode mix, the (polystyrenebutadiene rubber)-poly (acrylonitrile-co-acrylamide) polymer having the formula:

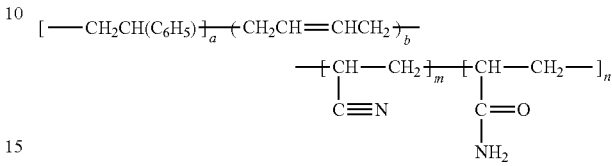

where $a=b=m=n=0.25$.

13. The method of claim 2, further comprising combining a positive active material, a water soluble binder comprising a (polystyrenebutadiene rubber)-poly (acrylonitrile-co-acrylamide) polymer, and a conductive additive to form a positive electrode mix, the (polystyrenebutadiene rubber)-poly (acrylonitrile-co-acrylamide) polymer having the formula:

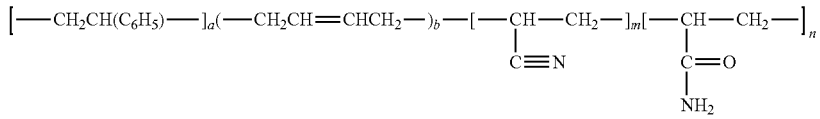

where $a=0.3$, $b=0.2$, $m=0.333$ and $n=0.167$.

14. The method of claim 2, further comprising combining a positive active material, a water soluble binder comprising a (polystyrenebutadiene rubber)-poly (acrylonitrile-co-acrylamide) polymer, and a conductive additive to form a positive electrode mix, the positive active material comprising about 1 to 20 percent by weight of the positive electrode mix and the water soluble binder comprising about 1 to 10 percent by weight of the positive electrode mix.

* * * * *